US010221693B2

United States Patent
Chan et al.

(10) Patent No.: US 10,221,693 B2
(45) Date of Patent: Mar. 5, 2019

(54) TRENCH COOLING OF AIRFOIL STRUCTURES

(71) Applicant: General Electric Company, Schenectady, NY (US)

(72) Inventors: George Joe-Kueng Chan, Lynn, MA (US); Ronald Scott Bunker, West Chester, OH (US); Victor Hugo Silva Correia, Lynn, MA (US); Christopher Kanoa Hoffman, Lynn, MA (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 14/901,450

(22) PCT Filed: Jul. 3, 2014

(86) PCT No.: PCT/US2014/045387
§ 371 (c)(1),
(2) Date: Dec. 28, 2015

(87) PCT Pub. No.: WO2015/047516
PCT Pub. Date: Apr. 2, 2015

(65) Prior Publication Data
US 2016/0369633 A1    Dec. 22, 2016

Related U.S. Application Data

(60) Provisional application No. 61/842,693, filed on Jul. 3, 2013.

(51) Int. Cl.
*F01D 5/18* (2006.01)
*F01D 5/14* (2006.01)
(Continued)

(52) U.S. Cl.
CPC ............. *F01D 5/187* (2013.01); *F01D 5/143* (2013.01); *F01D 5/18* (2013.01); *F01D 5/186* (2013.01);
(Continued)

(58) Field of Classification Search
CPC ................................. F01D 5/186; F01D 5/187
See application file for complete search history.

(56) References Cited

U.S. PATENT DOCUMENTS

| 5,419,681 A | 5/1995 | Lee |
| 6,210,112 B1 | 4/2001 | Tabbita et al. |

(Continued)

FOREIGN PATENT DOCUMENTS

| DE | 102007038858 A1 | 3/2008 |
| EP | 1091090 A2 | 4/2001 |

(Continued)

OTHER PUBLICATIONS

International Search Report issued in connection with corresponding PCT application No. PCT/US2014/045387 dated Mar. 19, 2015.

*Primary Examiner* — Justin Seabe
(74) *Attorney, Agent, or Firm* — General Electric Company; William Andes (57) ABSTRACT

An airfoil comprises at least one wall defining a leading edge, a trailing edge, a pressure side extending between the leading edge and the trailing edge, and a suction side extending between the leading edge and the trailing edge. The airfoil is curved in three dimensions and has one or more cavities defined by an interior surface of the at least one wall. A plurality of cooling film holes extending between the cavity and at least one cooling trench located on at least one of the pressure side and the suction side, spaced from the leading edge. The at least one trench has a floor spaced from an outer surface of the airfoil. The plurality of (Continued)

cooling film holes extend through the floor at an angle other than perpendicular.

14 Claims, 7 Drawing Sheets

(51) Int. Cl.
*F01D 9/04* (2006.01)
*F01D 25/12* (2006.01)
*F04D 29/32* (2006.01)
*F04D 29/54* (2006.01)
*F04D 29/58* (2006.01)

(52) U.S. Cl.
CPC ............ *F01D 9/041* (2013.01); *F01D 25/12* (2013.01); *F04D 29/324* (2013.01); *F04D 29/542* (2013.01); *F04D 29/5846* (2013.01); *F05D 2220/32* (2013.01); *F05D 2260/202* (2013.01); *Y02T 50/673* (2013.01); *Y02T 50/676* (2013.01)

(56) References Cited

U.S. PATENT DOCUMENTS

| | | | | |
|---|---|---|---|---|
| 8,870,535 B2* | 10/2014 | Lacy | ........................ | F01D 5/186 416/97 R |
| 8,870,536 B2* | 10/2014 | Lacy | ........................ | F01D 5/186 416/97 R |
| 9,022,737 B2* | 5/2015 | Piggush | .................. | F01D 5/186 416/97 R |
| 9,080,451 B2* | 7/2015 | Simpson | .................. | F01D 5/186 |
| 2011/0097188 A1 | 4/2011 | Bunker | | |
| 2011/0186550 A1 | 8/2011 | Gannelli | | |
| 2011/0305582 A1* | 12/2011 | Lee | ........................ | F01D 5/186 416/97 R |
| 2013/0045106 A1* | 2/2013 | Lacy | ........................ | F01D 5/186 416/237 |
| 2014/0047844 A1* | 2/2014 | Teller | ........................ | F01D 5/187 60/728 |

FOREIGN PATENT DOCUMENTS

| | | |
|---|---|---|
| EP | 1790821 A1 | 5/2007 |
| EP | 2154333 A2 | 2/2010 |
| WO | 2011156805 A1 | 12/2011 |

* cited by examiner

TRENCH COOLING OF AIRFOIL STRUCTURES

CROSS-REFERENCE TO RELATED APPLICATIONS

This application is a national stage application under 35 U.S.C. § 371(c) of prior filed, co-pending PCT application serial number PCT/US2014/045387, filed on Jul. 3, 2014, which claims priority to U.S. Provisional Patent Application Ser. No. 61/842,693, titled "Trench Cooling of Airfoil Structures" and having filing date Jul. 3, 2013, all of which is incorporated by reference herein.

STATEMENT OF FEDERALLY SPONSORED RESEARCH OR DEVELOPMENT

The Government has rights in this invention pursuant to Contract No. W911W6-11-2-0009 awarded by the United States Army Aviation Technology Directorate.

NAMES OF PARTIES TO A JOINT RESEARCH AGREEMENT

None.

BACKGROUND

The disclosed embodiments generally relate to one or more structures for cooling an airfoil. More particularly, but not by way of limitation, present embodiments relate to trench cooling of airfoils including, but not limited to, a nozzle.

A typical gas turbine engine generally possesses a forward end and an aft end with its several core propulsion components positioned axially therebetween. An air inlet or intake is at a forward end of the engine. Moving toward the aft end, in order, the intake is followed by a compressor, a combustion chamber, a turbine, and an outlet/exhaust at the aft end of the engine. It will be readily apparent from those skilled in the art that additional components may also be included in the gas turbine engine, such as, for example, low-pressure and high-pressure compressors, and high-pressure and low-pressure turbines. This, however, is not an exhaustive list. The gas turbine engine also typically has an internal shaft axially disposed along a center longitudinal axis of the engine. The internal shaft is connected to both the turbine and the compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy wherein each set of stator vanes turns and accelerates the combustion gases to engage an adjacent row of rotating turbine blades.

In the formation of components for aircraft and aircraft engines, such as for non-limiting example, turbine structures, blades, vanes and shrouds, various components are insulated from heat by thermal barrier coatings ("TBCs"), but most rely on various types of air-cooling to reduce or control temperature. For example, film cooling injects a thin blanket of cool air over one or more surfaces of the components, while effusion cooling pushes cool air through a lattice formed of closely spaced, discrete pores, or holes, in the component.

The cooling film holes are utilized in order to attain temperatures that are within limits of the part so that the part or component does not deteriorate or become damaged in the high temperature, pressure and stress environment of gas turbine engines. These cooling film holes receive bypass or cooling air within the aircraft engine to pass through the parts or components and provide the cooling necessary for operation in the extreme conditions. Current cooling film holes are formed by machining the cooling film holes into the component after the component has been cast. This adds cost and time to the process of forming the components. Additionally, the current technology being shaped diffuser holes are highly dependent on geometry of the diffuser, its feed hole and the cast wall thickness.

Reliable and accurate inspection of diffuser holes is currently difficult and sometimes requires destructive evaluation or cutup of the component. This is undesirable.

As may be seen by the foregoing, it would be desirable to overcome these and other difficulties with cooling systems of gas turbine engine components.

SUMMARY

According to present embodiments, one or more trenches may be utilized for providing cooling air to an airfoil surface. These trenches are in flow communication with interior airfoil cavities and utilize cooling film holes of simple geometry. The trenches are spaced from the leading edge of the airfoil and at an angle to the flow of hot combustion gas.

According to some embodiments, an airfoil comprises at least one wall defining a leading edge, a trailing edge, a pressure side extending between the leading edge and the trailing edge, and a suction side extending between the leading edge and the trailing edge. The airfoil is curved in three dimensions and has at least one cavity defined by an interior surface of the at least one wall. A plurality of cooling film holes extending between the interior cavity and at least one trench located on at least one of the pressure side and the suction side, spaced from the leading edge. The trench has a floor spaced from an outer surface of the airfoil. The plurality of cooling film holes extending through the floor at an angle other than perpendicular to the floor.

All of the above outlined features are to be understood as exemplary only and many more features and objectives of the structures and methods may be gleaned from the disclosure herein. Therefore, no limiting interpretation of this summary is to be understood without further reading of the entire specification, claims, and drawings included herewith.

BRIEF DESCRIPTION OF THE DRAWINGS

The above-mentioned and other features and advantages of this disclosure, and the manner of attaining them, will become more apparent and the trench cooling of airfoil structures will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that embodiments of the present invention covers such modifications and variations as come within the scope of the appended claims and their equivalents.

Referring to FIGS. 1-9, various embodiments of a trench cooling embodiment for use with an airfoil. The trench is spaced from the leading edge of an airfoil and may be located on various surfaces of the airfoil. A plurality of cooling film holes extending through the airfoil within the trench and subsequently provide cooling air over the surface of the airfoil. The trench may extend at an angle to the combustion gas flow and may be machined or formed such that it follows the curvature of the 3 dimensional surface to maintain a consistent or constant depth and width. In this configuration, the film holes feed into the trench, the cooling air spreads out to fill the trench, and then the film of cooling air can move over the 3 dimensional surface as a fully covering film.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine outlet, or a component being relatively closer to the engine outlet as compared to the engine inlet. As used herein, the terms "radial" or "radially" refer to a dimension extending between a center longitudinal axis of the engine and an outer engine circumference.

Figure 1:
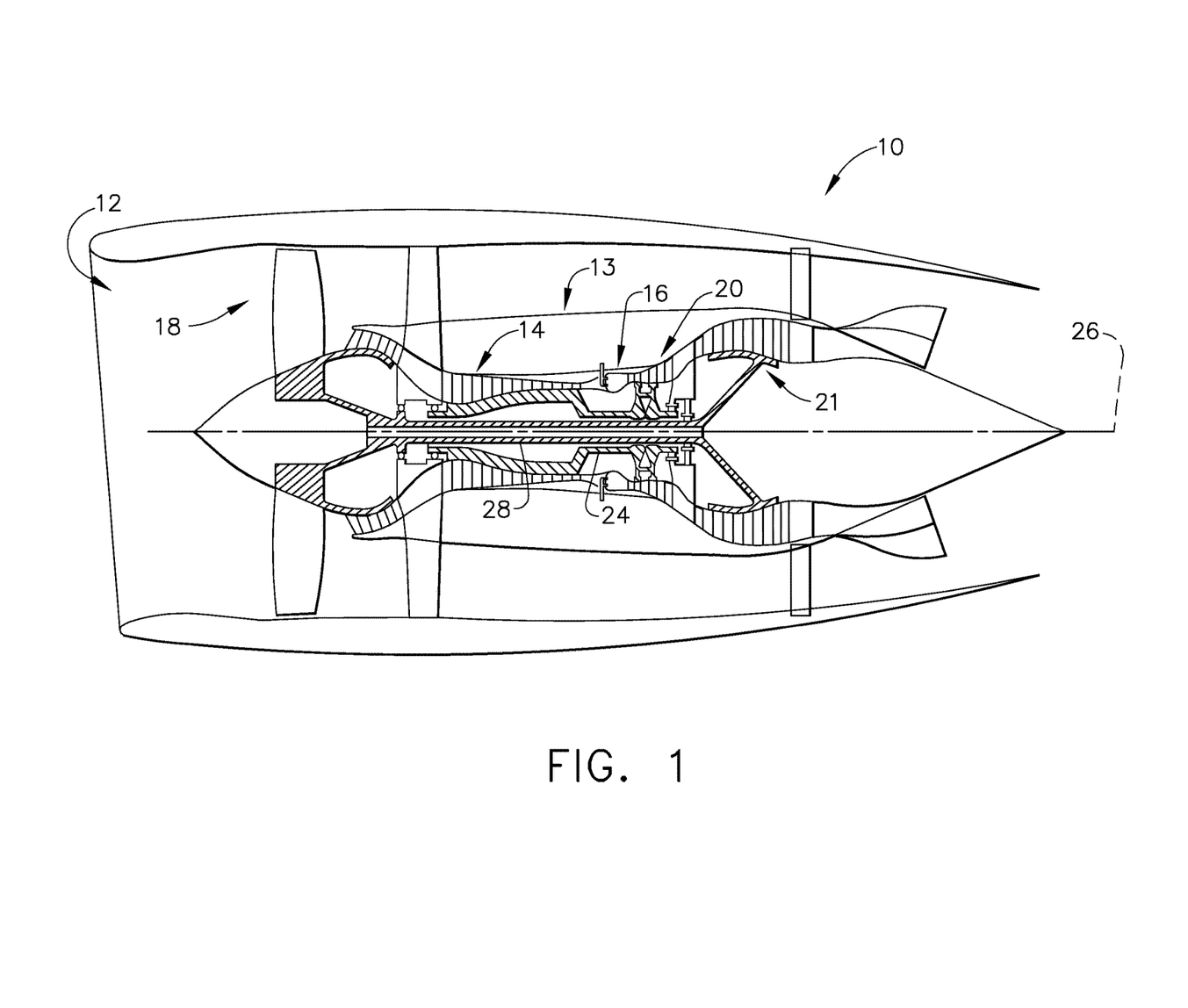
FIG. 1 is a side section view of a gas turbine engine.

Referring initially to FIG. 1, a schematic side section view of a gas turbine engine 10 is shown having an engine inlet end 12 wherein air enters the core propulsor 13 which is defined generally by a compressor 14, a combustor 16 and a multi-stage high pressure turbine 20. Collectively, the core propulsor 13 provides power during operation so that the gas turbine engine 10 may be used for aviation, power generation, industrial, marine or the like.

In operation air enters through the engine inlet end 12 of the gas turbine engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of a first, high pressure shaft 24. The high pressure shaft 24 passes toward the front of the engine to continue rotation of the one or more stages of compressor 14. A fan 18 is connected by a second, low pressure shaft 28 to a low pressure turbine 21 and creates thrust for the gas turbine engine 10. A low pressure turbine 21 may also be utilized to extract further energy and power additional compressor stages. The high pressure compressor air may be used to aid in cooling components of the engine as well.

The gas turbine engine 10 is axis-symmetrical about engine axis 26 so that various engine components rotate thereabout. The axis-symmetrical high pressure shaft 24 extends through the gas turbine engine 10 forward end into an aft end and is rotatably supported by bearings along the length of the shaft structure. The high pressure shaft 24 may be hollow to allow rotation of the low pressure shaft 28 therein and independent of the high pressure shaft 24 rotation. The low pressure shafts 28 also may rotate about the engine axis 26.

Figure 2:
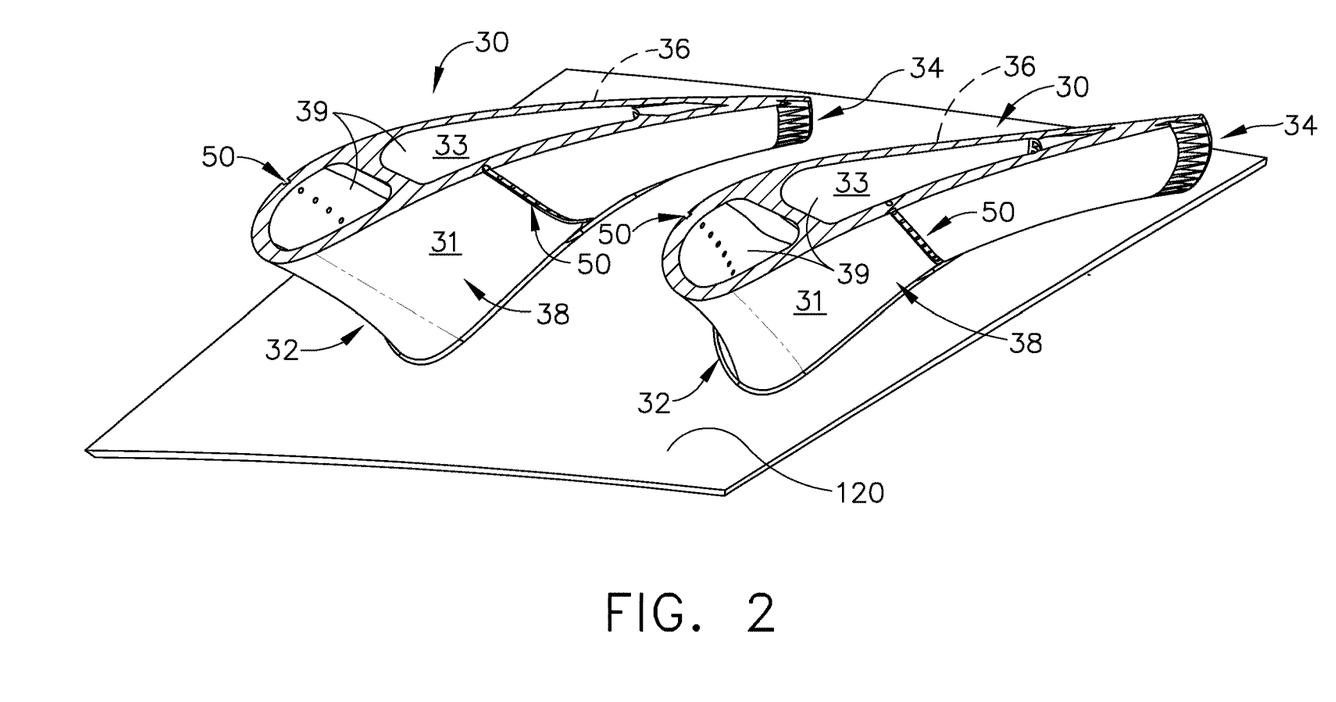
FIG. 2 is an isometric view of an airfoil.

Referring now to FIG. 2, an isometric view of an airfoil 30. Although airfoil 30 is depicted as a nozzle vane, various types of airfoils may be utilized with the embodiments shown herein and the description of any single airfoil embodiment should not be considered limiting. For example, the cooling trenches described further herein may also be utilized with vanes, blades or any airfoil structure requiring cooling during operation.

The airfoils 30 are curved three dimensionally. For example, the airfoils 30 may have curvature moving in the axial direction from leading edge to trailing edge. The airfoils 30 may have curvature moving in the radial direction from root end to tip end. The airfoils 30 may also have curvature moving in a circumferential direction, for example right to left along inner band or inner endwall 120. Additionally, the airfoils may have curvature or twist about a radial axis extending through the airfoil. The trenches may receive by-pass cooling air from either the low pressure or high pressure compressor for example.

The airfoil 30 includes at least one wall having an outer surface 31, an inner surface 33, a leading edge 32, a trailing edge 34, a suction side 36 and a pressure side 38. The suction and pressure sides 36, 38 extend radially upward from the root end to the tip end in the radial direction and further extend from the leading edge 32 to the trailing edge 34. The internal portions of the airfoil 30 may be hollow or at least partially hollow to allow cooling air to move from inside one or more cavities 39 to the outer surfaces. Cooling of the pressure side 38 is shown in the depicted view through at least one cooling trench 50. The cooling trench 50 may be curved as it extends in the radial direction due to the curvature of the airfoil 30. The cooling trench 50 increases spreading of film cooling along the surface of the airfoil. This better accommodates turbulence effects and effects related to surface deposits or irregularities. One or more cooling trenches 50 may be utilized along the suction side 36 as well. In the instant embodiment, cooling trenches 50 may also be located near the leading edge 32 along the suction side 36.

Figure 3:
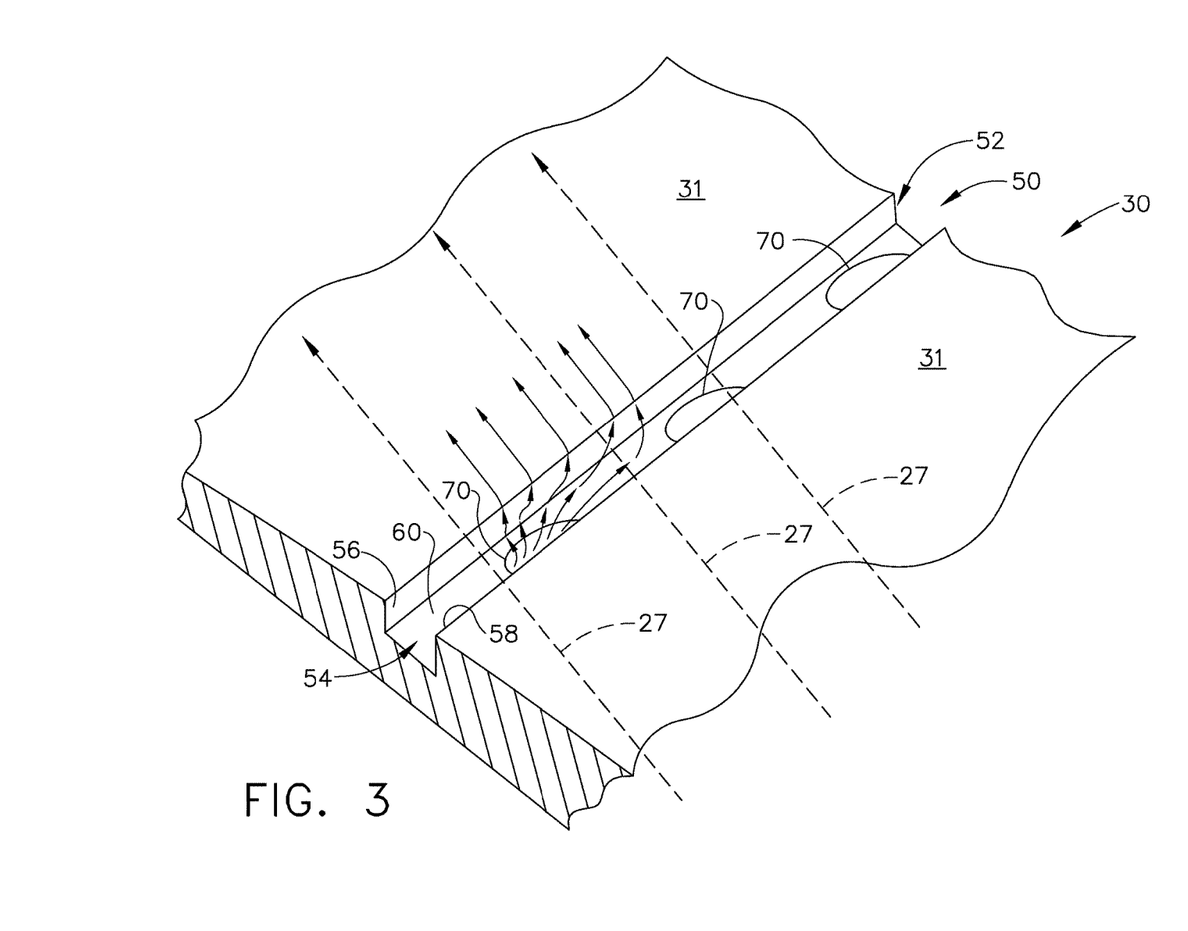
FIG. 3 is an isometric view of a cooling trench in an airfoil.

Referring now to FIG. 3, a detailed view of a portion of an airfoil 30 is depicted. The portion of airfoil 30 may be representative of suction side, pressure side or other portion of an nozzle, vane or blade, for example, or an outer endwall or inner endwall or platform as described further herein. The portion of airfoil 30 includes the cooling trench 50 extending across the outer surface adjacent to which high temperature combustion gases flow 27. In this embodiment, for example, cooling trench 50 extends in an engine radial direction while combustion gas moves in an engine axial direction. The cooling trench 50 includes a first end 52 and a second end 54 and is further defined by a first wall 56 and a second wall 58, both of which extend from a floor 60 and between the first and second ends 52, 54. These first and second walls 56, 58 may also be referred to as downstream and upstream walls relative to the hot gas flow moving across the cooling trench 50. Further, although the term floor is utilized, the cooling trench 50 may be inverted so that the floor is similar to a ceiling or upper boundary with walls depending therefrom or the cooling trench 50 may extend vertically for example. Therefore, the term floor should not be considered limiting. The cooling trench 50 may be cast or may be machined into the airfoil. Cooling film holes 70 extend from the one or more cavities 39 (FIG. 2) of the airfoil 30 to the trench floor 60 providing cooling air to the cooling trench 50 which passes from the cooling trench 50 and forms a film over the surface of the airfoil 30 protecting the surface of the airfoil 30 from the hot combustion gas flow 27. The cooling film holes 70 are generally circular in cross section however, such shape is not limiting as various alternate geometries may be utilized. Additionally, the cooling film holes 70 may be linear, curvilinear or segmented defined by either or both of linear or curvilinear segments. Further, the cross-sectional shape may change between ends of the cooling film holes 70.

Figure 4:
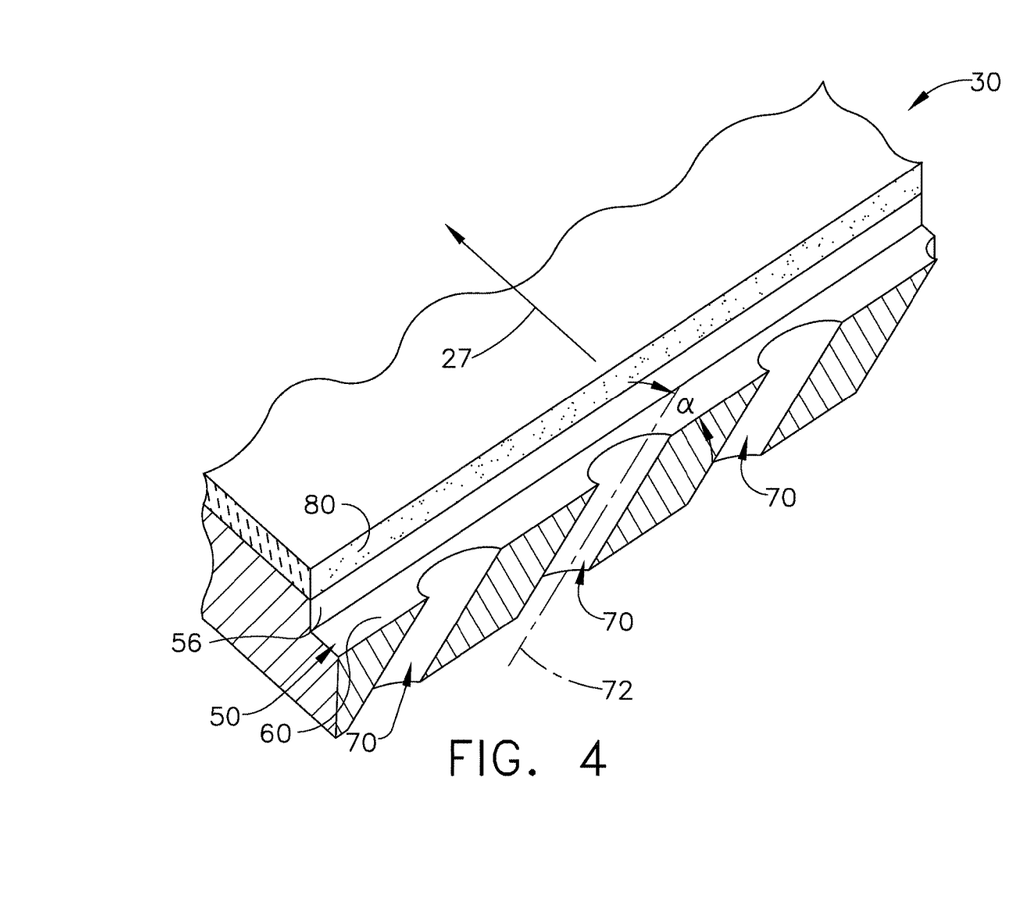
FIG. 4 is an isometric section view of the cooling trench shown in FIG. 3.

Referring now to FIG. 4, a section of the airfoil portion shown in FIG. 3 is cut to depict the cooling film holes 70 and the cooling trench 50. The cooling film holes 70 are generally cylindrical and extend through the wall of the airfoil 30 to the trench floor 60. The cooling film holes 70 each have an axis 72 which extends through the trench floor 60 at an angle α other than perpendicular to the floor. More specifically, the angular relationship with the floor (α) may be from about 15° to about 50° and more specifically about 20° to about 35°. The cooling film holes 70 are generally circular in cross-section and extend at an angle to define a cylindrical shape. However, such shape is not limiting as various shapes may be utilized. For example, oblong shaped cross-section may be utilized, or a polygon shaped cross-section may be used. One advantage of the instant embodiments is that the circular shape is easily manufactured and does not require the change in geometry of cooling film holes and multi slots which may be utilized and which require additional manufacturing attention due to the difficulty of forming such cooling film holes. Further, the configuration may be easily inspected without destructive action to the airfoil 30.

Structural relationships also exist between the cooling trench 50 and the cooling film holes 70. For example, according to some embodiments, the depth of the cooling trench 50 may be between 50% and 100% of the hole diameter. The depth is measured from the outer surface 31 of the airfoil 30 to the trench floor 60 of the cooling trench 50. More specifically, the depth may be between about 60% and about 80% of the hole diameter and according to some embodiments may be about 70% of the hole diameter. The cooling trench 50 may have a width of 110% to about 165% of the feed hole diameter. Additionally, the wall thickness of the airfoil 30 may be sufficient to ensure the hole length is at least about 150% of the film hole diameter.

The outer surface of the airfoil above the first wall 56 may also include a barrier coating 80 which protects the outer surface of the airfoil from the high temperature of the combustion gas flow 27. The barrier coating 80 may be a thermal barrier utilized in addition to the cooling film holes 70 which supply cooling air from the interior of the airfoil 30 to the exterior in order to limit material temperatures. The barrier coating 80 may be applied to the airfoil 30 after the cooling trench 50 is formed or before the trench is formed. In the instance that the barrier coating 80 is applied after the cooling trench 50 is formed, the barrier coating 80 may or may not extend into the cooling trench 50 along first and second walls 56, 58 and trench floor 60. Care should be taken to inhibit plugging of the cooling film holes 70 however. Further, it should be understood that while one barrier coating 80 is depicted, the barrier coating 80 may be comprised of one or more layers of materials. While the barrier coating 80 is optional, the above referenced dimensions and relationships may be applied relative to the coating if such coating is utilized and dependent upon if the coating is used on the trench floor.

The relationship of the first and second walls 56, 58 and trench floor 60 may vary. The first and second walls 56, 58 may be perpendicular to the trench floor 60 or at some angle that is non-perpendicular to the trench floor 60. The first and second walls 56, 58 may be linearly extending from the trench floor 60. Alternatively, the first and second walls 56, 58 may extend curvilinearly from the trench floor 60 according to some embodiments. As will be shown further herein, the trench floor 60 is depicted as a linear segment in the instant embodiment but also may be curvilinear from first end 52 to second end 54 depending upon the curvature of the airfoil surface to which the cooling trench 50 is applied. Therefore, the first and second walls 56, 58 may also be linear or curvilinear between first and second ends 52, 54. Additionally, upper edges of the first and second walls 56, 58 may be chamfered or may be radiused in addition or alternatively to the edges depicted.

In operation of the gas turbine engine 10 (FIG. 1), the cooling trench 50 fills with cooling fluid and before exiting from within the cooling trench 50 and creating a film along the outer surface of the airfoil 30. This prevents immediate mixture with the hot combustion gas and exits the cooling trench 50 as a more continuous cooling layer. This also provides that the film spreading over the airfoil surface is less affected by turbulence effects. The cooling trench 50 generally extends at an angle to the combustion gas flow and may or may not be perpendicular thereto.

Figure 5:
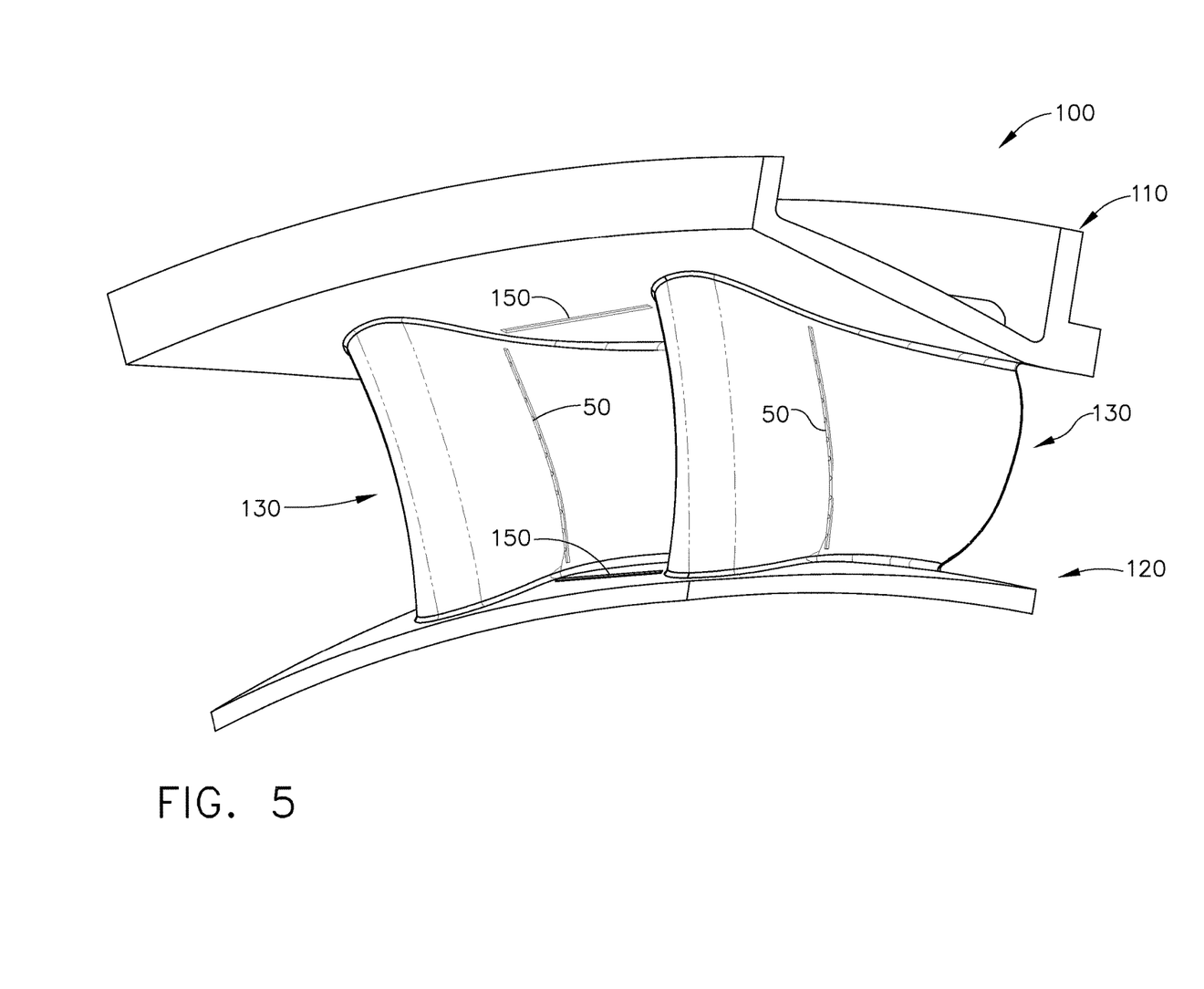
FIG. 5 is an isometric view of a nozzle segment.

Referring now to FIG. 5, a nozzle segment 100 is depicted. The nozzle segment 100 is positioned adjacent other nozzle segments to define a circumferential nozzle extending about the axis 26 (FIG. 1) of the engine. The nozzle segment 100 includes an outer band or outer endwall 110 and an inner band or inner endwall. Extending between the inner and outer endwalls 120, 110 is at least one airfoil 130. In an embodiment, two airfoils 130 are depicted for each nozzle segment 100 between the endwalls 110, 120. Each airfoil 130 includes a pressure side, suction side, leading edge and trailing edge as previously described. The airfoils 130 are three-dimensional in nature in that the leading edge and trailing edge may be curved in the circumferential, radial and axial directions. Various cooling trenches 50 are depicted in the instant nozzle segment 100. According to the instant embodiments, at least one cooling trench 50 is located on each of the pressure sides. Additionally, cooling trenches 150 are disposed on the surfaces of the outer endwall 110 and inner endwall 120 extending in a circumferential direction generally between the adjacent airfoils 130 at an angle to combustion gas flow. The cooling trenches 150 are located near endpoints of the cooling trenches 50. The cooling trenches 50, 150 are all spaced from the leading edge of the airfoils 130. The cooling trenches 50, 150 may be located at generally equivalent distances from the forward or aft end of the airfoils 130, or alternatively may be at different distances. Further, the cooling trenches 150 may be located axially forward of the airfoils 130 according to some embodiments.

Figure 6:
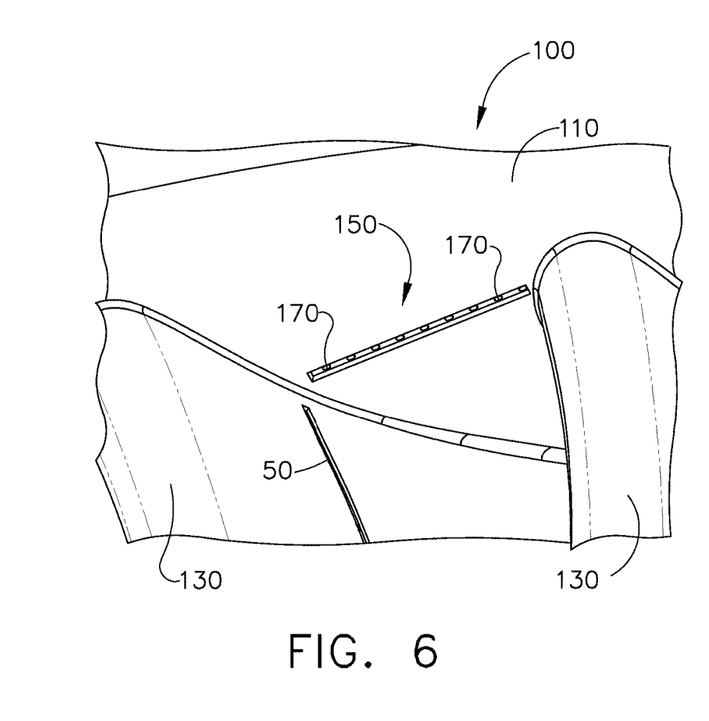
FIG. 6 is an isometric view of an outer endwall trench.

Referring more specifically now to FIG. 6, an upper isometric view of the nozzle segment 100 is depicted with a detail view of the cooling trench 150 located on the outer endwall 110. The detailed view depicts the cooling trench 150 located along the surface of the outer endwall 110 facing the airfoils 130. The cooling trench 150 is similar to the previously described cooling trench 50 in that the cooling trench 150 includes a first wall and a second wall extending from a floor. In this instance, the floor is above the first and second walls and receives cooling air from a plurality of cooling film holes 170 therein. The cooling trench 150 is depicted near endpoints of the cooling trench 50 located on the pressure side of one of the airfoils 130. However, the cooling trench 150 may be located at different positions axially along the surface of the outer endwall or band 110.

Figure 7:
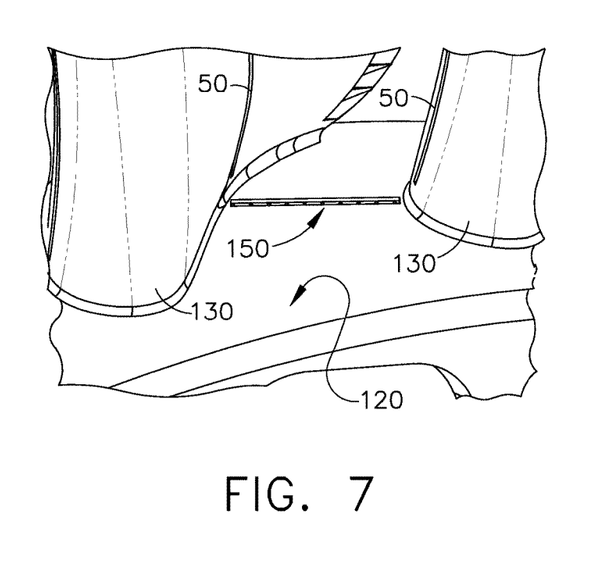
FIG. 7 is an isometric view of an inner endwall trench.

Referring now to FIG. 7 an isometric view of the inner endwall 120 is better shown with a detailed view depicting a cooling trench 150 extending along the inner endwall 120. In the detailed view, a cooling trench 50 is depicted on the suction side of the airfoil 130 and the cooling trench 150 is depicted along the inner endwall 120 extending from near the cooling trench 50 of a pressure side to the cooling trench 50 of the adjacent suction side of the adjacent airfoil 130.

Although one trench is shown on the outer endwall 110 and a single cooling trench 150 shown on the inner endwall 120, various trenches may be utilized and may be spaced along the axially dimension of the component to provide the desired cooling of combustion air passing through the nozzle segment 100. Similarly, one or more trenches 50, 150 may be utilized on the airfoils 130 along the pressure side and suction side and spaced from the leading edges of the airfoils.

Figure 8:
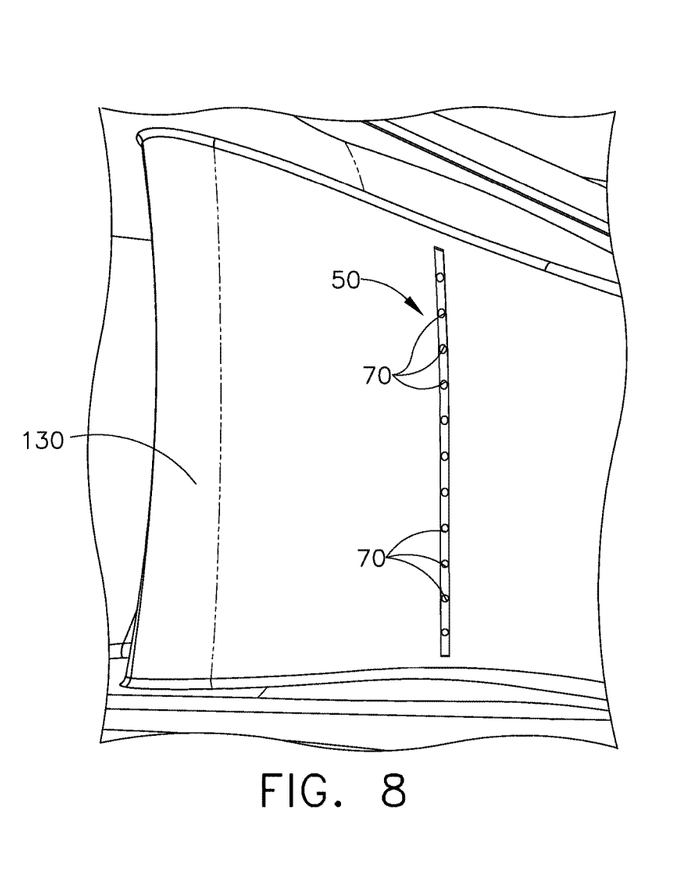
FIG. 8 is an isometric view of a nozzle vane having a pressure side trench; and, FIG. 9 is an isometric view of a nozzle vane having a suction side trench.

Referring now to FIG. 8, the pressure sides of airfoils 130 are depicted and the cooling trench 50 is depicted for improved visibility. The cooling trench 50 may extend at an angle to a purely radial dimension. In other words, the cooling trench 50 may not extend in a purely vertical manner but is at an angle and may have some curvature due to the curvature of the surface of the airfoil 130. Alternatively, the cooling trench 50 may extend radially and linearly or combinations of radial/non-radial and linear/non-linear segments, in whole or in part.

Figure 9:
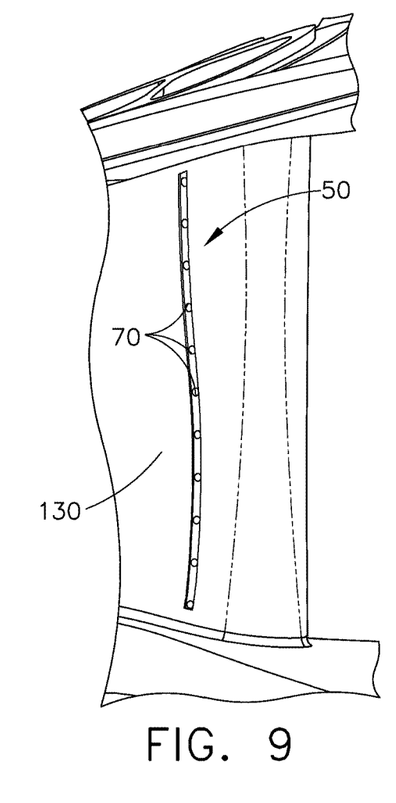

Referring to FIG. 9, a suction side cooling trench 50 is also depicted. The suction side cooling trench 50 may be located at various positions in the axial direction along the surface of the airfoil 130. The cooling trench 50 depicts additional curvature due to the three-dimensional nature of the airfoil 130. Thus, the cooling trench 50 does not extend purely linearly but has curvature due to the three-dimensional curvature of the airfoil 130.

The cooling trenches 50, 150 are formed to follow the curvature of the 3 dimensionally curved surface and maintain a consistent or constant depth and width. The cooling film holes 70 feed cooling air into the trench, and the cooling air spreads out to fill the cooling trench 50, 150. Then, the film of cooling air moves onto the 3 dimensionally curved surface as a fully covering film. Additionally, the trenches allow for improved inspection without destructive techniques being needed.

The term "airfoil" is shown and described in combination with a nozzle vane. However, the term should not be construed as being limited to such vane as the term "airfoil" may also apply to blades which may use the cooling trenches which are spaced from the leading edge according to the instant embodiments. In fact, any three-dimensionally curved airfoil may utilize the trenches described herein, for example including fan blades, compressor blades, compressor vanes and turbine vanes and blades.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a"

and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

What is claimed:

1. An airfoil, comprising:
   at least one wall defining a leading edge, a trailing edge, a pressure side extending between said leading edge and said trailing edge, and a suction side extending between said leading edge and said trailing edge;
   said airfoil curved in three dimensions;
   at least one interior cavity defined by an interior surface of said at least one wall;
   a plurality of cooling film holes extending between said at least one interior cavity and at least one cooling trench located on at least one of said pressure side and said suction side, spaced from said leading edge;
   said at least one cooling trench having a floor spaced from an outer surface of said airfoil;
   said plurality of holes extending substantially parallel to a lengthwise direction of the trench in one plane and extending through said floor along the at least one cooling trench at an angle other than perpendicular, such that cooling air fills the at least one cooling trench before it exits from the at least one cooling trench as a film;
   wherein said at least one cooling trench extends curvilinearly between a first end and a second end.

2. The airfoil of claim 1, further wherein said floor extends between first and second walls.

3. The airfoil of claim 1, wherein said airfoil is one of a turbine blade, a turbine nozzle vane, a compressor blade and a compressor vane.

4. The airfoil of claim 1, wherein said at least one cooling trench extends linearly between a first end and a second end.

5. The airfoil of claim 1 further comprising at least one second cooling trench extending between adjacent airfoils.

6. The airfoil of claim 5, said at least one second cooling trench disposed in an outer band or an inner band.

7. The airfoil of claim 1, said trench having first and second walls.

8. The airfoil of claim 7, said first and second walls extending from said floor.

9. The airfoil of claim 8, said first and second walls being vertical.

10. The airfoil of claim 8, said first and second walls being perpendicular to said floor.

11. The airfoil of claim 8, said first and second walls being at an angle to said floor.

12. The airfoil of claim 8, said first and second sidewall being curvilinear.

13. The airfoil of claim 1, said at least one cooling trench disposed on said suction side.

14. The airfoil of claim 1, said at least one cooling trench disposed on said pressure side.

* * * * *